June 14, 1966  A. V. HINTON ETAL  3,256,093
PET FOOD BONE PRODUCT
Filed March 2, 1962

INVENTORS
Alan V. Hinton
Michael Gerzanich
by Arnold␣␣Worfolk
ATTORNEY

3,256,093
PET FOOD BONE PRODUCT
Alan V. Hinton, 150 74th St., Brooklyn, N.Y., and Michael Gerzanich, 103 Luther Ave., Hopelawn, N.J.
Filed Mar. 2, 1962, Ser. No. 177,077
6 Claims. (Cl. 99—2)

This application is a continuation-in-part of copending application Serial No. 804,655, filed April 7, 1959, and now abandoned.

This invention relates to a food product for pets comprising natural bone and to its method of manufacture.

The invention, by way of example, is illustrated herein by natural cuttlebone which is the skeleton of the cuttlefish. Cuttlebone is used as a bird food and serves as a source of calcium and protein as well as a means by which the bird sharpens its beak.

Natural cuttlebone has a relatively hard shell portion at one side and a portion of softer chalky consistency at the other side which the bird pecks off and consumes. The natural product is easily broken because of its brittleness whereas only unbroken bone has a ready market. The natural product may have more or less color variation depending upon its source whereas the most marketable bone has a minimum of color variation, or what is the same thing, a minimum of discoloration. The natural product has much waste since only the relatively softer chalky portion is consumed by the bird. For these reasons, among others, readily marketable cuttlebone is quite expensive.

The present invention provides a rigid molded bird food product comprising cuttlebone of powdery fineness embedded in a proteinaceous matrix. The cuttlebone portion of the product is, prior to molding preferably bleached so that the product is uniform in color and consistency. Indeed, vegetable coloring may be added to give various shades to the finished product if desired. Since broken as well as unbroken pieces of the natural cuttlebone may be used as the starting material and since all the finished product may be consumed, an economical product results.

The product is a rigid structure molded in any form desired. Its surface may be made as smooth as the natural shell. Its hardness throughout may be made substantially uniform and of one value or another depending upon the type of pet by whom the product is to be consumed.

Specifically, the bone product comprises for each 192 parts of bleached discrete powdery bone particles, preferably cuttlebone particles, from 18 to 78 parts of protein material of which a major portion, say 18 to 77 parts, preferably is gelatin and a minor portion, say 1 to 3 parts, egg albumin.

Cornstarch may be included to improve the smoothness of the mixture and the gelling characteristics of the gelatin. If cornstarch is used, up to 72 parts thereof is preferred for the 192 parts of cuttlebone. Salt for taste, say up to 3 parts may be included. Coloring in the form of approved vegetable coloring may be added in appropriate amount for the desired shade. The proteinaceous material (gelatin and albumin) form a matrix in which the discrete portions of cuttlebone are retained.

The bleached powdered cuttlebone may be prepared by soaking the natural bone in a solution of approximately 2% hydrogen peroxide for a period of about one to two weeks, i.e., long enough to remove much of the natural oils, proteinaceous materials, fats and salts from the bone.

In a batch process for the treatment of twelve (12) pounds of natural cuttlebone, a solution of one and one-half (1½) quarts of thirty-five percent (35%) hydrogen peroxide in seven (7) gallons of water was used. Successful results may also be obtained in an equivalent batch using five (5) gallons of water in place of the seven just mentioned. Between these two limits which correspond to a hydrogen peroxide concentration ranging from 1.75 percent to 2.50 percent, successful results may be obtained.

After bleaching, the bone is thoroughly rinsed to remove the separated unwanted materials as well as any residue of hydrogen peroxide. A typical analysis of bone thus bleached and after drying showed contents as follows

|  | Percent |
|---|---|
| Moisture | 0.85 |
| Protein | 2.81 |
| Fat | 0.10 |
| Fiber | 13.15 |
| Salt (NaCl) | 0.27 |
| Ash | 53.20 |

The washed, bleached cuttlebone is air dried and then ground into discrete particles. Some care must be taken to grind the bone to suitable size and consistency. Thus the discrete cuttlebone particles must be ground to a size that will not settle out of a solution of proteinaceous material thickened by beating as will hereinafter be described, and additionally the particles must not be discolored in the act of grinding.

Standard grinding mills are available for appropriately carrying out the grinding process. One such mill is a David Bradley plate mill grinder which has a stationary plate, and a rotatable plate adjustable toward and away from each other facewise. This mill operating at a speed of 650 r.p.m. may be adjusted to grind the bone without discoloration to produce particles of a fineness that will pass a 40 to 50 mesh silk screen. The size of particles and the method of grinding are given by way of example, it being understood that such particles of bone however obtained, and so long as they can be homogenously supported in a self-sustaining gelatinous mixture as hereinafter described, will serve for the purpose of this invention.

The mixture for the matrix may be prepared as follows. The egg albumin, salt, and cornstarch when used, are mixed together and the mixture presoftened by the addition of sufficient water to form a paste. The powdered gelatin is likewise presoftened in water. The presoftened gelatin is then dissolved in boiling water which upon standing and cooling forms a gel. Before cooling, however, the cornstarch, egg albumin and salt mixture is added to the gelatin solution and its temperature lowered to within the range of 100° to 105° F. by way of example. The mixture then is whipped or beat to introduce air sufficient to make the mixture self-supporting and with a body that can hold the bone particles in suspension without settling out. The bone particles are then added to the whipped mixture and the whipping continued to distribute them uniformly throughout, so that in effect each bone particle is encased in the gelatin matrix. This mixture then is placed in appropriate molds and refrigerated.

The molds may be any suitable nonrusting metal or a soft pliable material such as rubber. Rubber molds, if used, may be maintained in their desired form by a suitable rigid backing member conveniently made from plaster of Paris. Before filling with the whipped gelatin-bone mixture, the molds first are chilled to a temperature within the approximate range 5° to 32° F. This provides, on the outside of the finished product, a relatively smooth dense causing and on the inside a relatively porous structure with larger air cells, i.e., the air cells that have been introduced into the mixture by whipping. The smooth dense surface on the outside helps prevent breaking when the product is removed from the mold and permits it to holds its shape after removal from the mold and until it had dried. If the mold temperature is too low, premature gelling will occur which prevents the mixture from spreading out and conforming to the shape of the mold. On the other hand if the mold is not sufficiently chilled the dense outer sealing surface is not formed and air pockets remain on the surface, disfiguring the product and leaving it rough. The mold surface, if rubber, is lubricated before chilling to facilitate its stripping from the product. Petroleum jelly such as the material sold under the trade name "Vaseline" will suffice for this purpose. Metal molds require no lubrication.

A specific example of a good molded cuttlebone made in accordance with the invention is as follows:

| | Parts by weight |
|---|---|
| Bleached powdered cuttlebone | 192 |
| Gelatin | 24 |
| Egg albumin | 1 |
| Cornstarch (gelling type) | 16 |
| Salt | 2 |
| Water | 192 |

Mix the cornstarch, egg albumin, and salt with 32 parts of cold water to form a paste. Presoften the gelatin by mixing it with 64 parts of water. Any water temperature from cold to boiling will suffice. Dissolve the presoftened gelatin mixture in 96 parts of boiling water and add to it the cornstarch, egg albumin, and salt mixture. Cool to a temperature between 100° and 105° F. and beat (usually about 1 minute) until mixture has a consistency which is self-supporting. Add the powdered cuttlebone to the mixture gradually and continue beating for about 1 minute or until a homogenous mixture is secured. Fill prechilled molds with homogenous mixture and refrigerate at a temperature within the range 2° to 10° F., preferably 6° for a period of from 10 to 30 minutes. Fifteen minutes of refrigeration is usually long enough to set the product sufficiently to permit its removal from the mold.

Upon its removal from the mold and air drying, a hard bonelike structure results comprising cuttlebone particles in a proteinaceous matrix, it being understood that the gelatin and the albumin used in the manufacture of the product are essentially protein. Air drying usually takes about 12 to 18 hours. Initial drying is at room temperature until a hard coating is formed. Thereafter drying preferably is carried out at a temperature of about 90° F. to 100° F. Maintenance of this second stage drying temperature constant eliminates some curling which otherwise seems to occur if the drying temperature during this stage is allowed to vary. However, except for such curling, the product is otherwise the same.

The cornstarch used should be a gelling type. That sold under the trademark "Argo" by Cornstarch Products Refining Co. is an example of a type that may be used.

Whiteness in the finished product may be enhanced by the addition of blueing. Usually, however, blueing need not be added unless the bone has been darkened during the grinding process. But as previously stated, other colors may be added as for instance yellow, pink, or green. The coloring preferably is added during the second stage and for each 24 ozs. of water it has been found that 2 drops of blueing will give a good white, and 120, 36, and 30 drops respectively of yellow, pink, and green certified food color for bone of these latter shades. Shade, of course, is a matter of taste and the amount added accordingly may be varied.

Figure 1:
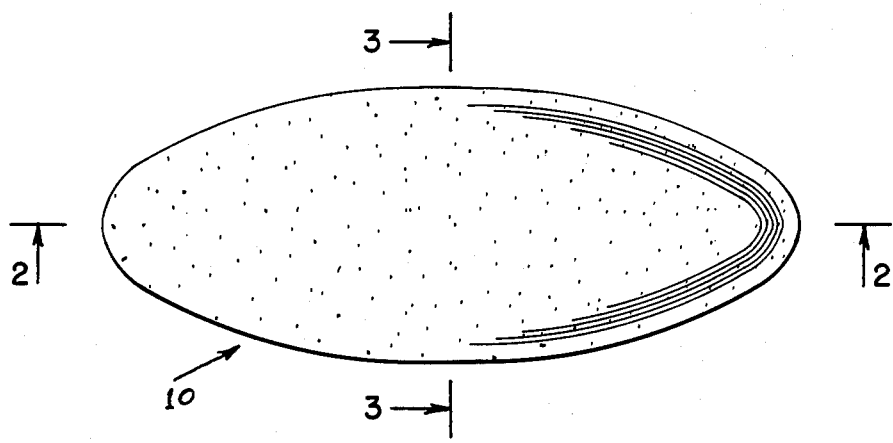
FIG. 1 is a plan view of a cuttlebone product molded in accordance with the invention to simulate the shape of a piece of natural cuttlebone.
Figure 2:
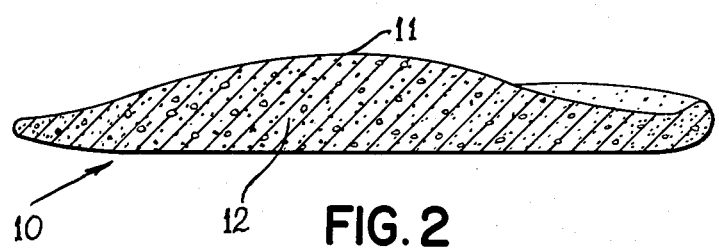
FIG. 2 is a sectional view on line 2—2 of FIG. 1.
Figure 3:
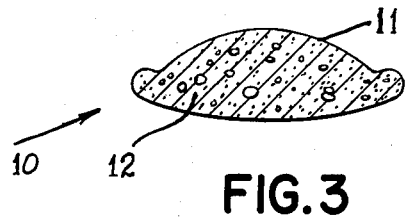
FIG. 3 is a sectional view on line 3—3 of FIG. 1.

In the drawings there is shown a molded bone 10 whose exterior surface 11 is relatively dense and smooth and whose inner body portion 12 exhibits a more porous, cell like structure resulting from air entrapped during the beating process. Hardness and strength in the product may be controlled by varying the gelatin content and the beating time. A softer product is obtained by increasing the amount of gelatin. A stronger less brittle product is obtained by decreasing the beating time. Increasing the beating time entraps more air and thereby increases the volume of the finished product per unit of weight. Products ranging from approximately two and one-quarter (2¼) to five (5) cubic inches per ounce have been found excellent. The desideratum as regards hardness and strength contemplates a product whose exterior surface permits penetration by the beak of a bird such as a canary or parakeet to enable consumption but which at the same time will resist any substantial quick disintegration of the product into its discrete particles during consumption.

The invention has been described in its preferred form but many modifications thereof are included within its spirit. The appended claims define its limitation.

What is claimed is:

1. A cuttlebone pet food product comprising discrete particles of ground cuttlebone embedded in a proteinaceous matrix, said ground cuttlebone particles being distributed substantially uniformly throughout the matrix and said matrix with the ground cuttlebone particles embedded therein being in the form of a rigid structure comprising by weight, 192 parts of ground cuttlebone and from 18 to 78 parts of proteinaceous material of which a major portion is gelatin and a minor portion egg albumin.

2. Cuttlebone material comprising discrete particles of bleached cuttlebone of powdery fineness embedded in a matrix, said matrix with the cuttlebone particles embedded therein being in the form of a rigid structure with a dense exterior surface and a less dense cellular interior body structure.

3. A bird food product comprising particles of cuttlebone of powdery fineness embedded in a proteinaceous matrix, said matrix with the cuttlebone embedded therein being in the form of a rigid structure including by weight of the order of 192 parts cuttlebone powder, 18 to 78 parts proteinaceous material of which a major portion is gelatin and a minor portion egg albumin, 0 to 72 parts cornstarch, salt for flavoring and added coloring.

4. A bird food product comprising bleached particles of cuttlebone of powdery fineness embedded in a proteinaceous matrix, said matrix with the cuttlebone embedded therein being in the form of a rigid structure including by weight of the order of 192 parts of hydrogen peroxide bleached cuttlebone powder, 18 to 78 parts proteinaceous material of which a major portion is gelatin and a minor portion egg albumin, 0 to 72 parts cornstarch and with salt for flavoring and vegetable material for coloring.

5. A bird food cuttlebone product having a rigid molded structure consisting essentially of 192 parts of ground cuttlebone distributed substantially uniformly throughout 18 to 78 parts of proteinaceous material of which a major proportion is gelatin, said parts being by weight.

6. A bird food cuttlebone product having a rigid molded structure consisting essentially of a major proportion of ground cuttlebone distributed substantially uniformly throughout a minor proportion of a mixture of proteinaceous material and starch, a major proportion of the mixture being proteinaceous material and a major proportion of the proteinaceous material being gelatin, and said cuttlebone and proteinaceous material being present in the proportion by weight of 192 parts cuttlebone to form 18 to 78 parts proteinaceous material.

References Cited by the Examiner

UNITED STATES PATENTS

| | | | |
|---|---|---|---|
| 148,632 | 3/1874 | Tompkins | 99—4 |
| 982,711 | 1/1911 | Ellis | 99—2 |
| 1,791,175 | 7/1931 | Tomlinson | 99—4 |
| 2,593,577 | 4/1952 | Lewis | 99—2 |
| 2,622,027 | 12/1952 | Torr | 99—107 |

FOREIGN PATENTS 108,809   10/1939   Australia.

A. LOUIS MONACELL, *Primary Examiner.*

D. DONOVAN, *Assistant Examiner.*